Figure 1:
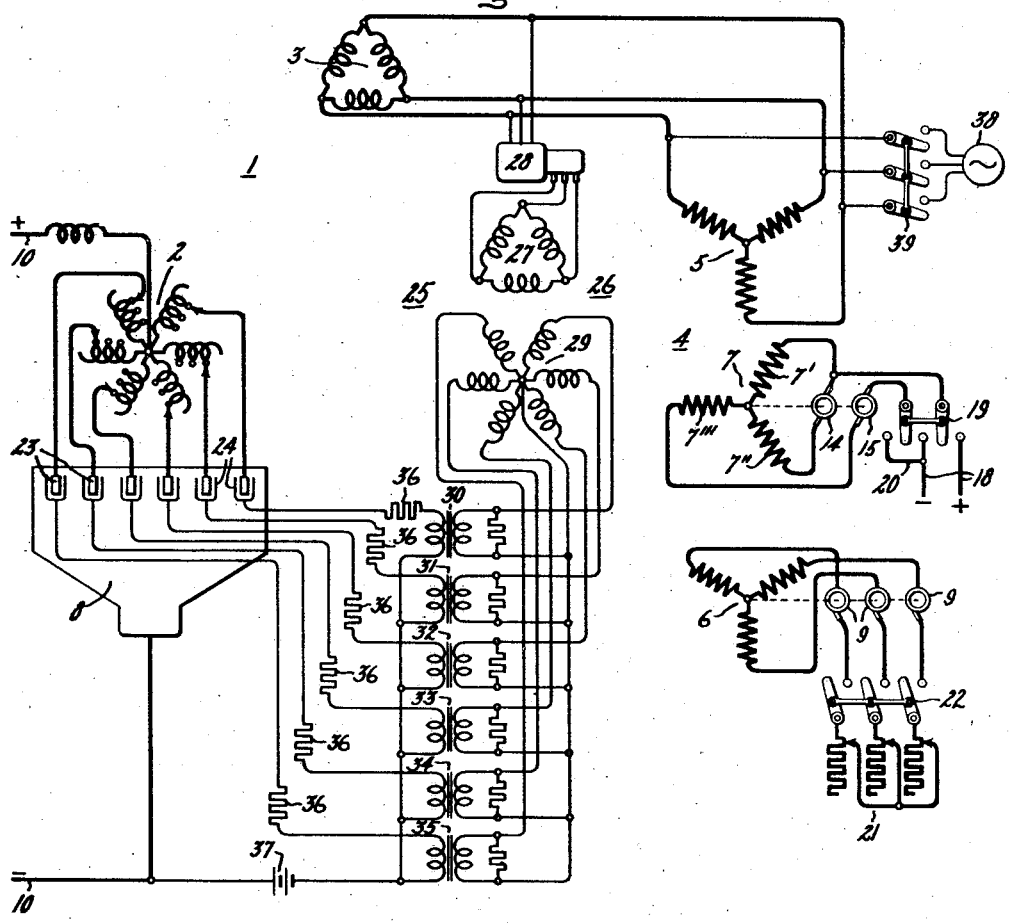

Sept. 2, 1941.  M. STÖHR  2,254,714

ELECTRIC VALVE OPERATED MOTOR

Filed Oct. 13, 1938

Inventor:
Max Stöhr,
by Harry E. Dunlavy
His Attorney.

Patented Sept. 2, 1941

2,254,714

UNITED STATES PATENT OFFICE 2,254,714

ELECTRIC VALVE OPERATED MOTOR

Max Stöhr, Berlin-Hermsdorf, Germany, assignor to General Electric Company, a corporation of New York Application October 13, 1938, Serial No. 234,817
In Germany October 13, 1937

11 Claims. (Cl. 172—274)

My invention relates to electric valve operated motors and more particularly to an arrangement for starting motors which are energized by means of electric valves with control electrodes from a source of direct current.

The energization of motors from high voltage direct current networks is becoming more and more important. In connection therewith one of the problems encountered is the energization of direct current railways at higher voltages on the trolley bus than has heretofore been possible when direct current motors provided with conventional commutators are used. The electric valve operated motor has offered a solution to this problem. If motor operation is desired, as in the case of electric locomotives, the commutatorless electric valve operated motor is, in general, preferred to the direct current transformer with commutator motor, because the electric valve operated motor is able to rectify the current which must otherwise be accomplished by the commutator.

The main difficulty which the valve commutated motor presents is experienced when starting such motor from a direct current source. As long as the motor is at standstill it is impossible to commutate the current between the anodes of the converting apparatus as is essential in order to establish a rotating field in the motor windings unless some commutating potential is introduced into the valve circuit. If the electric valve operated motor were to be energized from an alternating current supply this problem would not arise, for in this case the natural passage through zero of the current at the end of every half cycle of the alternating current source makes commutation of the current between the various anodes a simple matter.

In order to overcome the commutation problem experienced when the valve operated motor is energized with direct current it has been suggested to introduce during the starting period an additional commutation voltage obtained from an auxiliary source. Such an arrangement has been described and claimed in my prior United States Letters Patent No. 2,023,255, granted December 3, 1935. Although it is possible to switch off this auxiliary source after the motor has been started, nevertheless, in connection with drives where frequent starting is necessary, for instance in connection with electric locomotives, the auxiliary source must continue to operate in order to be ready continuously for service. Furthermore, the total expenditure is considerably increased when such an auxiliary source is necessary.

Another difficulty is experienced with locomotives of the larger type wherein the axles thereof, in order to decrease service costs, are separately driven instead of in common by means of connecting rods, and where the individual motors do not run in exact synchronism because of the somewhat unequal wear and tear on the wheel rims, thus giving rise to small differences in the number of revolutions. If electric valve operated motors were used these differences in speed would require that each motor have a separate electric valve converting apparatus of its own which must be controlled by the particular motor in question. If, furthermore, the motors are supplied with current from the high voltage direct current network through a direct current transformer, the individual drive of the axles necessitates a separate transformer for every motor on account of the above-mentioned differences in the speed, whereby such arrangements are rendered more complicated and expensive than where a single transformer is provided for all motors.

It is, therefore, an object of my invention to overcome the above-mentioned disadvantages of the prior art devices and to provide an improved and simplified arrangement for starting valve controlled electric motors from a direct current source.

It is another object of my invention to provide a new and improved apparatus and method for starting an electric valve operated motor from a direct current source.

It is a further object of my invention to provide a starting arrangement for a valve operated motor requiring only a small apparatus for introducing a commutating voltage into the motor circuit.

In accordance with the illustrated embodiment of my invention, I provide an electric valve operated motor energized from a direct current source through an electric valve converting apparatus. This motor is so constructed and arranged that there is generated in the motor while at a standstill a rotating field having a certain definite frequency, this field delivering the counter electromotive force which opposes the impressed voltage supplied by the electric valve converting apparatus, and provides the commutation voltage necessary for starting the motor. In order to produce the above-mentioned rotating field in the motor while it is at standstill I provide an intermediate rotor which is freely movable upon the shaft of the motor. This intermediate rotor continues to rotate at all times whether the conventional rotor which drives the axle of the locomotive is at standstill or not. Auxiliary means for starting this intermediate rotor are provided after which it continues to rotate until the locomotive is brought back to the shop. Speed control of the valve operated motor is obtained in several different manners, for example, by means of grid control, tap changing of the transformer or inserting resistance into the rotor windings of the electric valve operated motor.

My invention, both as to its organization and method of operation, together with other and further objects thereof, will best be understood by reference to the following description taken in connection with the accompanying drawing, and its scope will be pointed out in the appended claims. In the accompanying drawing, Fig. 1 diagrammatically illustrates an embodiment of my invention, while Fig. 2 is a cross section of the motor used in connection with my invention.

Figure 2:
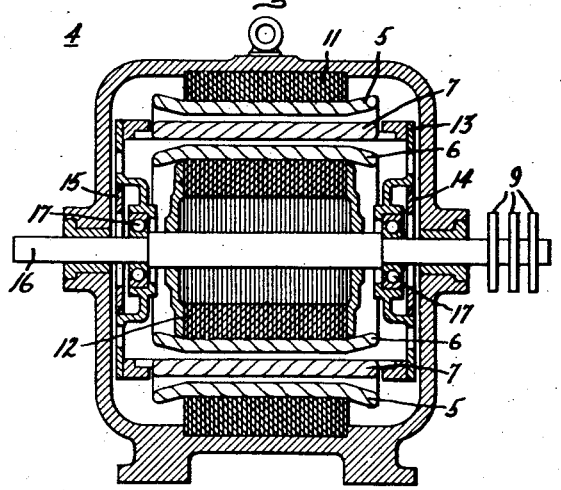

Referring now to Fig. 1 of the drawing, I have illustrated therein an electric valve converting apparatus for transmitting energy from the high voltage direct current source 10 to the dynamo-electric machine 4 through a transformer 1 and an electric valve device 8. The transformer 1 is provided with a primary winding 2 illustrated as a six-phase winding provided with taps for the regulation of the voltage. The secondary winding 3 of transformer 1 is directly connected to the stator winding 5 of dynamo-electric machine or motor 4. Dynamo-electric machine 4 is provided with a rotor winding 6 having a plurality of phases connected in wye, the terminals of which are provided with a plurality of sliprings 9 substantially in the same manner as the conventional wound rotor induction motor. Referring now to Fig. 2 the physical construction of the dynamo-electric machine 4 is illustrated in cross section. The stator 11 includes stator winding 5 while the rotor 12 includes rotor winding 6. Between the stator and the rotor and mounted coaxially with respect to the rotor is an intermediate rotor 13 provided with intermediate rotor winding 7 also shown in Fig. 1. This intermediate rotor 13 consists of a thin cylindrical member of such size as to just support the intermediate rotor winding 7. Intermediate rotor 13 is freely rotatable upon the shaft 16 of dynamo-electric machine 4 and is provided with suitable bearings 17 on either end thereof. Thus it is possible for intermediate rotor 13 to rotate relative to rotor 12 which is firmly attached to shaft 16. The intermediate rotor winding 7 is illustrated in Fig. 1 as provided with a plurality of phases 7', 7'' and 7''' connected in wye relation, the phase windings 7' and 7'' being connected to one slip ring 14 while the phase winding 7''' is connected to slip ring 15, these slip rings being also shown in Fig. 2. Phase windings 7' and 7'' of intermediate rotor winding 7 are connected in closed circuit relation by means of slip ring 14 so that this portion of intermediate rotor winding 7 may act as a suitable damping winding through which the high frequency currents may flow. However, intermediate rotor winding 7 is arranged to be energized by direct current from a suitable direct current source 18 through double pole, double throw switch 19. This direct current may be variable so as to obtain speed control of said intermediate rotor 13. A short circuit member 20 is provided which by means of switch 19 may be connected across the phase windings 7', 7'' and 7''' of intermediate rotor winding 7 for starting purposes as will be described in detail hereinafter. It will be understood by those skilled in the art that a separate damper winding may be provided for dynamo-electric machine 4 instead of requiring winding 7 to function both as a damper winding and as a field winding energized with direct current. Output power from motor 4 is obtained from shaft 16 to which rotor 12 carrying rotor winding 6 is rigidly attached.

Rotor winding 6 of dynamo-electric machine 4 is provided with three phase variable resistors 21 which may be inserted in series with the respective phases of rotor winding 6 by means of switch 22. This arrangement is very similar to the well known starting means for wound rotor induction motors wherein resistances are inserted in series with the rotor windings for starting purposes. In the arrangement illustrated in Fig. 1 the resistances are shown in the particular position so as to completely short circuit the respective phases of the rotor winding 6 when switch 22 is in its closed position.

Electric valve device 8 is provided with a plurality of anodes 23 each having associated therewith a control electrode or grid 24. Although electric valve device 8 is illustrated as of the single cathode, multi-anode type of electric discharge valve well known to those skilled in the art, it will be understood that a plurality of single anode, single cathode valves might equally well be used. Any well known control circuit may be used for controlling the operation of electric discharge device 8 and I have illustrated a conventional grid control circuit 25 comprising a main grid transformer 26 having primary winding 27 energized through a suitable phase shifting transformer 28 from the terminals of stator winding 5. Grid transformer 26 also includes a six-phase secondary winding 29, the terminals of which are connected with one terminal of the primary winding of a plurality of transformers 30, 31, 32, 33, 34 and 35. The secondary windings of transformers 30 to 35 are connected to the respective control electrodes or grids 24 of electric valve device 8 through a plurality of current limiting resistors 36. A suitable bias battery 37 is connected in the grid circuits associated with the respective control electrodes 24 so as to provide a negative bias for these electrodes. As will be described hereinafter, in view of the intermediate rotor 13 carrying rotor winding 7 it is not necessary to provide a separate distributor for the grid circuit of my valve commutated motor as is the case in connection with prior art devices. Therefore the distributor along with the operating difficulties encountered therewith may be dispensed with entirely. Although I have illustrated a specific control circuit 25, it will be understood by those skilled in the art that any other suitable control arrangement may be provided. In the valve operated motors of the prior art only a single rotor is provided as contrasted with the arrangement illustrated in Figs. 1 and 2 where the intermediate rotor 13 provided with winding 7 is included. This intermediate rotor winding 7 energized with direct current cooperates with stator winding 5 to form in themselves a dynamo-electric machine which is very similar to the well known synchronous motors. Thus if switch 22 is in the open position dynamo-electric machine 4 might be considered as a synchronous motor and rotor 13 supporting rotor windings 6 could be removed entirely without effecting the operation of stator winding 5 and intermediate rotor winding 7. When the arrangement illustrated in Fig. 1 is used in connection with an electric locomotive then intermediate rotor 13 provided with winding 7 is started from standstill position by short circuiting the terminals thereof, which is accomplished by moving switch 19 to the left-hand position, and energizing the stator member 5 from any suitable source of alternating current 38 through switching means 39. Alternating current source 38 is very small in proportion to the capacity of dynamo-electric machine 4. By this arrangement the intermediate rotor 13 begins to rotate and the dynamo-electric machine comprising windings 5 and 7 acts as an induction motor with short circuited secondary windings. As soon as a suitable speed is attained switch 19 is moved to the right-hand position as illustrated in Fig. 1 so as to be energized with direct current from source 18, after which the dynamo-electric machine 4 comprising stator winding 5 and intermediate rotor winding 7 operates as a synchronous motor. Since the direct current source 10, which in the case of a locomotive would comprise the trolley bus, is always connected to the terminals of the electric valve device 8 energy will be transmitted from high voltage direct current source 10, through the respective anodes 23 operating in proper sequence, to the stator winding 5 of dynamo-electric machine 4 as soon as the counter electromotive force produced by intermediate rotor winding 7 is sufficient to commutate the current from anode to anode. If now switch 39 is opened intermediate rotor 7 will continue to rotate as the rotor of a synchronous machine by virtue of power from direct current source 10 inverted by valve device 8. By this arrangement, therefore, it is possible to start rotation of main rotor 12 including rotor winding 6 which may be suitably connected to the axles of the electric locomotive and furthermore this rotor may be started from standstill position from the direct current source since the necessary commutating voltage is supplied from intermediate rotor winding 7 which continuously rotates.

In explaining the operation of the arrangement illustrated in Fig. 1, it will be assumed that the switches 19, 22 and 39 are in the positions indicated in the diagram. It will be assumed also that the apparatus is installed on an electric locomotive and that the high voltage direct current of source 10, in this case obtained from the trolley bus, is impressed on terminals of the electric valve device 8. It will, of course, be understood by those skilled in the art that this electric valve operated motor has many uses and I do not wish to limit my invention to its use in connection with an electric locomotive, reference to an electric locomotive being made for purposes of explanation only. Since no potential is impressed on the primary winding 27 of grid transformer 26, a negative bias from battery 37 is impressed on all the control electrodes or grids 24 of electric valve device 8 and therefore even though the direct current potential from source 10 is impressed across the converting apparatus, no electrical energy is transmitted through valve device 8. While the locomotive is in the shop, for example, switch 19 is moved to the left-hand position so as to short circuit the phase windings 7', 7'' and 7''' of intermediate rotor winding 7. The tap changing elements on the primary winding 2 of transformer 1 are moved to the lowest voltage tap. Then, switch 39 is moved to its closed position connecting alternating current source 38 across the terminals of stator winding 5. When this alternating voltage is impressed across the terminals of stator winding 5, intermediate rotor 13 carrying winding 7 begins to rotate and the machine starts in substantially the same manner as a conventional wound rotor induction motor with the secondary winding thereof short circuited. As soon as intermediate rotor 13 carrying windings 7 has attained a sufficiently high speed to produce a counter-electromotive force of sufficient magnitude, this counter-electromotive force is impressed through grid transformer 26 upon control electrodes or grids 24 and electric valve device 8 begins to operate as an inverter supplying energy to stator winding 5 from direct current source 10. Switch 39 may now be opened and switch 19 moved to the right-hand position so as to be energized with direct current and from then on intermediate rotor 13 including winding 7 operates in cooperation with stator winding 5 as a synchronous motor to supply the commutation voltage necessary for operating the inverter. When it is desired to start the locomotive, therefore, switch 22 is closed with the resistances 21 in the position indicated in the diagram, that is, so that the terminals of rotor winding 6 are short circuited. Since a commutating voltage is supplied by intermediate rotor winding 7, rotor 12 including rotor winding 6 may be started from standstill and the locomotive may be started and stopped at will, commutating voltage being at all times supplied by intermediate rotor member 13.

In order to stop the valve operated motor 4, its speed is first reduced by decreasing the voltage obtained from valve device 8 which may be accomplished by the tap changing arrangement provided on the primary winding 2 of transformer 1 after which switch 22 is opened. Rotor 12 which may be directly connected with the axles of the locomotive then stops rotating and the locomotive approaches the standstill position. The intermediate rotor, however, continues to rotate and is always ready for the next starting operation of the motor. The source of alternating current 38 for starting the intermediate rotor which is very small in proportion to the capacity of the motor 4, may be provided from an auxiliary supply on the locomotive or may be obtainable only in the locomotive shop and used to start the intermediate rotor rotating before the locomotive is put into service.

Since the intermediate rotor is freely rotatable, several motors may be supplied with current from a single electric valve device 8. The speed of the intermediate rotor, of course, depends upon the magnitude of the voltage supply and also upon the excitation. Thus by changing the taps on the primary winding 2 of transformer 1 speed control is obtained. This intermediate rotor may also be given series characteristics by energizing the windings 7 thereof with direct current proportional to the direct current supplied to the electric valve device 8 as will be understood by those skilled in the art.

The variable resistances 21 arranged to be connected in series with rotor winding 6 provide another means for regulating the speed of rotor 12. By suitably adjusting phase shifter 28, another means is provided as will be understood by those skilled in the art for controlling the speed of operation.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent in the United States is:

1. In combination, a dynamo-electric machine provided with a plurality of relatively rotatable windings and including a rotor for connection with a mechanical load, a source of direct current, a plurality of electric discharge paths, means for energizing one of said windings from said source through said plurality of electric discharge paths, and means comprising another of said windings and a direct current voltage for energizing the same for producing an electromagnetic field linking the winding with which said discharge paths are associated to induce therein a counter-electromotive force independently of said rotor for commutating the current between said discharge paths.

2. In combination, a dynamo-electric machine provided with a stator winding, a rotatable winding, and a rotor for connection to a mechanical load, a source of high voltage direct current, means for energizing said stator winding from said source comprising a plurality of electric discharge paths, and means including said rotatable winding for producing an electromagnetic field linking said stator winding to induce therein a commutating voltage for said electric discharge valves when said rotor is at standstill.

3. In combination, a dynamo-electric machine provided with a stator winding, a rotor winding, and a rotor for connection to a mechanical load, a source of high voltage direct current, means for energizing said machine from said source comprising a plurality of electric discharge paths, said rotor winding being energized by a direct current voltage and rotatable in said dynamo-electric machine independently of said rotor to produce an electromagnetic field which links the winding with which said electric discharge paths are associated to induce therein a counter-electromotive force of definite frequency for commutating the current between said discharge paths, said rotor being designed to operate as the rotor of an induction motor.

4. In combination, a dynamo-electric machine provided with a stator and a rotor, a source of direct current, means for energizing said machine from said source comprising a plurality of electric discharge valves associated with said stator, a second rotor in said dynamo-electric machine coaxially mounted with respect to said first mentioned rotor for producing the commutating voltage for said plurality of electric discharge valves during the starting period of said dynamo-electric machine.

5. The combination of an electric motor provided with a stator winding and a rotor, a source of direct current, means for energizing said motor from said source including a plurality of electric discharge paths associated with said stator winding, means for commutating the current between said discharge paths while starting said motor comprising means forming a part of said motor for producing a counter electromotive force in said motor while said rotor is at standstill.

6. In combination, a source of high voltage unidirectional current, an electric motor of the alternating current type having a stator winding including a plurality of phases and having electric valve means connected for controlling and sequentially energizing said stator w nding from said direct current source, a rotor for connection to a mechanical load, means forming a part of said motor for producing a counter-electromotive force for commutating the current from the electric valve means associated with one phase of said stator winding of said motor to the electric valve means associated with another phase of said stator winding when said rotor is at standstill.

7. In combination, a dynamo-electric machine provided with a stator winding and a rotor winding, a source of high voltage direct current, means for energizing said machine from said source comprising a plurality of electric discharge paths, means including a second rotor winding on said dynamo-electric machine for producing a counter electromotive force of definite frequency for commutating the current between said discharge paths during the starting period of said dynamo-electric machine, and means for energizing said second rotor winding from a source of direct current.

8. In combination, a dynamo-electric machine provided with a stator winding and a rotor winding, a source of high voltage direct current, means for energizing said machine from said source comprising a plurality of electric discharge paths, means including a second rotor winding on said dynamo-electric machine connected to act as a damper winding and to produce a counter electromotive force of definite frequency for commutating the current between said discharge paths during the starting period of said dynamo-electric machine.

9. In combination, a dynamo-electric machine provided with a stator winding and a rotor winding, variable resistance means arranged to be connected in series with said rotor winding, a source of high voltage direct current, means for energizing said machine from said source comprising a plurality of electric discharge paths, and means including a second rotor winding on said dynamo-electric machine for producing a counter electromotive force of definite frequency for commutating the current between said discharge paths when said machine is at standstill.

10. In combination, a dynamo-electric machine provided with a stator winding and a rotor winding, a source of high voltage direct current, means for energizing said machine from said source comprising a plurality of electric discharge valves, means including a second rotor winding on said dynamo-electric machine for producing a counter electromotive force of definite frequency for commutating the current between said discharge paths during the starting period of said dynamo-electric machine, and means for controlling the speed of said dynamo-electric machine.

11. In combination, a dynamo-electric machine provided with a stator winding and a rotor winding, a source of high voltage direct current, means for energizing said machine from said source comprising a plurality of electric discharge paths, means including a second rotor winding on said dynamo-electric machine for producing a counter electromotive force of definite frequency for commutating the current between said discharge paths when said machine is at standstill, means for controlling the speed of rotation of said second mentioned rotor winding, and means for controlling the speed of rotation of said first mentioned rotor winding.

MAX STÖHR.